United States Patent

Sakurada

[11] Patent Number: 5,614,102
[45] Date of Patent: Mar. 25, 1997

[54] METHOD FOR PURIFYING SEWAGE

[76] Inventor: Yasuyuki Sakurada, 6-3, Shitte 3-chome, Tsurumi-ku, Yokohama-shi, Kanagawa-ken, Japan

[21] Appl. No.: 465,185

[22] Filed: Jun. 5, 1995

Related U.S. Application Data

[63] Continuation-in-part of Ser. No. 283,166, Aug. 3, 1994, abandoned, which is a continuation of Ser. No. 916,080, Aug. 29, 1992, abandoned.

[30] Foreign Application Priority Data

Jul. 29, 1990 [JP] Japan ........................ 2-18140

[51] Int. Cl.$^6$ ............................................. C02F 1/52
[52] U.S. Cl. ............... 210/718; 95/151; 95/152; 95/205; 95/226; 210/721; 210/724; 210/725; 210/728; 210/738; 210/916; 210/919; 210/906
[58] Field of Search .................... 210/631, 709, 210/712, 718, 721, 724, 725–728, 760, 916, 919, 906, 738; 95/151, 152, 205, 226

[56] References Cited

U.S. PATENT DOCUMENTS

| | | | |
|---|---|---|---|
| 1,364,387 | 1/1921 | Landreth | 210/721 |
| 2,320,512 | 6/1943 | Daily | 210/721 |
| 3,419,493 | 12/1968 | Pangle | 210/44 |
| 3,474,033 | 10/1969 | Stout et al. | 210/721 |
| 3,725,265 | 4/1973 | Legal | 210/45 |
| 3,947,350 | 3/1976 | Cardinal | 210/711 |
| 3,963,637 | 6/1976 | Chappell | 210/726 |
| 4,049,545 | 9/1977 | Horvath | 210/726 |
| 4,137,163 | 1/1979 | Young | 210/706 |
| 4,724,084 | 2/1988 | Pahmeier et al. | 210/709 |
| 4,765,908 | 8/1988 | Monick et al. | 210/728 |
| 5,034,137 | 7/1991 | Okamoto et al. | 210/727 |
| 5,350,511 | 9/1994 | Sakurada | 210/199 |

FOREIGN PATENT DOCUMENTS

| | | |
|---|---|---|
| 394814 | 6/1992 | Australia . |
| 2217414 | 6/1974 | France . |
| 50-52849 | 5/1975 | Japan . |
| 54-35022 | 10/1979 | Japan . |
| 56-47836 | 11/1981 | Japan . |
| 63-55997 | 11/1988 | Japan . |

*Primary Examiner*—Peter A. Hruskoci
*Attorney, Agent, or Firm*—Wenderoth, Lind & Ponack

[57] ABSTRACT

A sewage purification method which includes a first step in which at least two kinds of flocculants are introduced in sewage for stirring and mixing therewith so as to float and settle inorganic and organic materials. The first step is sequentially repeated more than one time. Next, at least three kinds of flocculants are introduced into the supernatant obtained in the first step for stirring and mixing therewith so as to further float and settle remaining inorganic and organic materials. At least one of the first and second steps is sequentially repeated more than one time. In the above way, middle water, drinking water and super-pure water can be obtained from sewage. Purification of exhaust gas is also possible by introducing such exhaust gas in one of the above steps.

3 Claims, 5 Drawing Sheets

Fig. 1

(CONTAMINATED WATER)

↓

A PROCESS IN WHICH AT LEAST TWO KINDS OF FLOCCULANTS ARE INTRODUCED INTO A SEWAGE FOR STIRRING AND MIXING THEREWITH SO AS TO FLOAT AND SETTLE INORGANIC AND ORGANIC MATERIALS.

↓

(PURIFIED SUPERNATANT)

↓

A PROCESS IN WHICH SAID FIRST PROCESS IS REPEATED MORE THAN ONE TIME.

↓

(PURIFIED WATER)

Fig. 2

(CONTAMINATED WATER)

↓

A PROCESS IN WHICH AT LEAST TWO KINDS OF FLOCCULANTS ARE INTRODUCED INTO A SEWAGE FOR STIRRING AND MIXING THEREWITH SO AS TO FLOAT AND SETTLE INORGANIC AND ORGANIC MATERIALS.

↓

(PURIFIED SUPERNATANT)

↓

A PROCESS IN WHICH AT LEAST THREE KINDS OF FLOCCULANTS ARE INTRODUCED INTO THE SUPERNATANT OBTAINED IN SAID FIRST PROCESS FOR STIRRING AND MIXING THEREWITH SO AS TO FLOAT AND SETTLE REMAINING INORGANIC AND ORGANIC MATERIALS.

↓

(PURIFIED SUPERNATANT)

↓

A PROCESS IN WHICH AT LEAST ONE OF SAID FIRST PROCESS AND SAID SECOND PROCESSS IS REPEATED MORE THAN ONE TIME.

↓

(PURIFIED WATER)

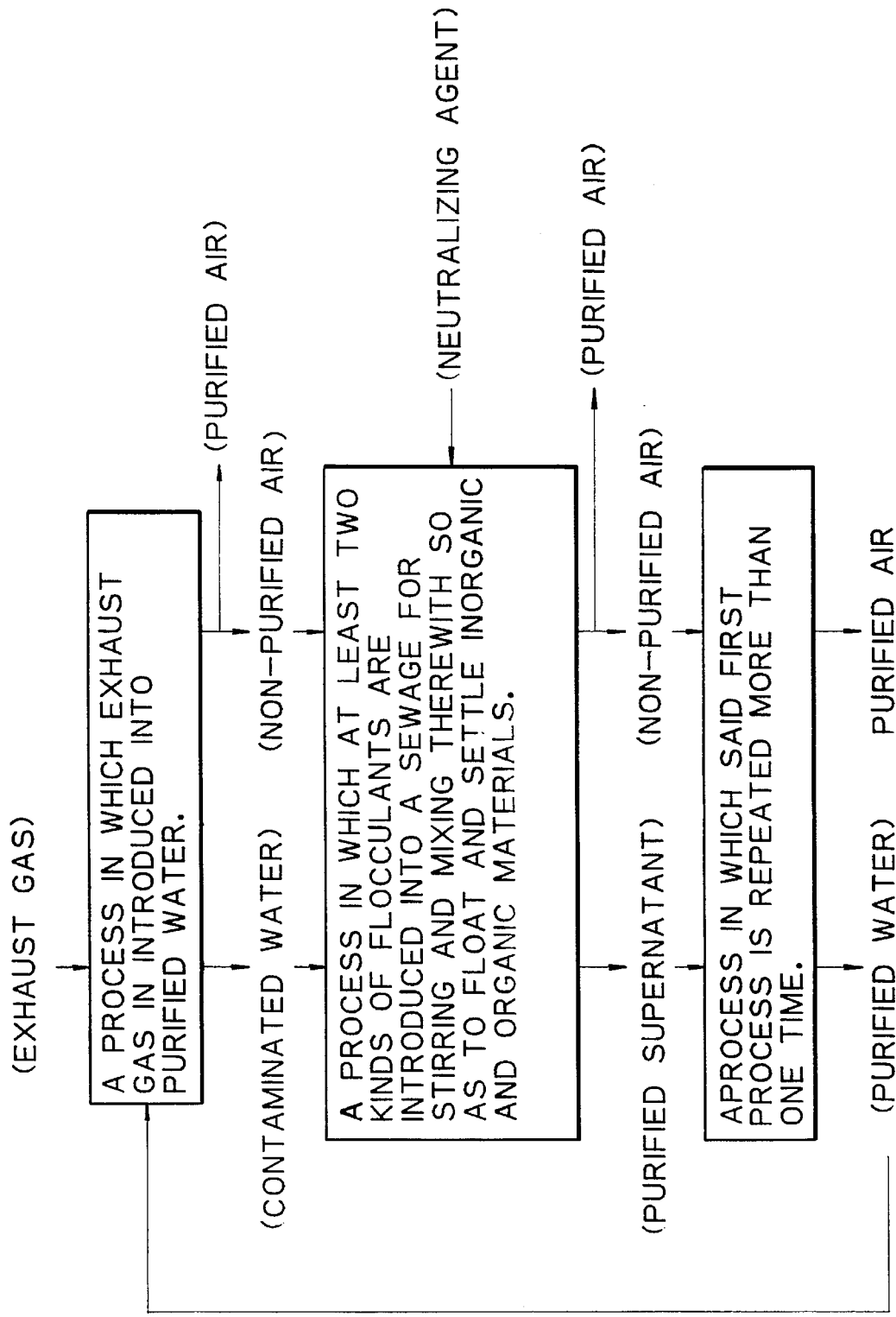

METHOD FOR PURIFYING SEWAGE

This application is a continuation-in-part of application Ser. No. 08/283,166, filed Aug. 3, 1994, which in turn is a continuation of application Ser. No. 07/916,080, filed Aug. 29, 1992, both abandoned.

TECHNICAL FIELD

This invention relates to a method for highly purifying contaminated rivers, lakes, swamps, bay seawater, domestic sewage, industrial waste fluid, butcher waste fluid, sewage, dust waste fluid, garbage incinerator waste fluid, dung, agricultural chemicals, germicides, kitchen sewage and the like.

BACKGROUND TECHNOLOGY

Conventional sewage purification apparatuses use a concrete reservoir in a spacious land or building, wherein an apparatus to culture aerobic bacteria is equipped in the reservoir water to which bacteria are continuously supplemented. Simultaneously, air is sent by a pump in the water for activation. Contaminated water diluted by several-fold water is contacted by bacteria so that contaminants included in the water is digested by bacteria and purified. However, it takes several months and needs large equipment and high costs. It also needs an enormous land and apparatus for complete purification. Because of this, contaminated water has undesirably been drained in rivers after diluted by several-fold water, resulting in polluted rivers, lakes, swamps and seas. A filtering apparatus using sands, activated carbon, membranes or the like, is much expensive and very uneconomical.

In the past, various kinds of single flocculants have been used to purify water by cohering and removing sludge and inorganic matters from contaminated water. Aluminum sulfate, ferric chloride, alum, polymer flocculants and the like have been used alone as the flocculant. When contaminated water was mixed and stirred with a single flocculant and left to settle, only small stones and sands cohere and settle on the bottom of the container after 6 to 24 hours, whereas the water would not become transparent. In civil constructions, the process was repeated until the contaminated water became transparent. However, it was impossible to remove impurities dissolved in the water even spending 30% of the construction costs.

Contaminated water generated in construction sites was sent by a pump into a large tank installed on the highest mountain or hill nearby, wherein the water was stirred with a single flocculant and left for 6 to 24 hours to separate inorganic matters by cohesion-sedimentation. Then supernatant, though still translucent, was transferred to another purification tank installed at a lower level, wherein a flock was stirred again and left for 6 to 24 hours, thereafter the supernatant was transferred to another tank installed on the hill at a lower level. This process was repeated several times.

Said process was repeated more than 6 to 10 times, and transparent water was finally drained into the river. Even now, ferric chloride, alum or the like is used in construction sites. (However, BOD and COD of the contaminated water or purified water are not taken into account.) Therefore, even if the water became transparent, it was still contaminated.

Several features in using a single flocculant are as follows:

(1) Flocculation and purification effects are low and slow;
(2) No deodorant effect can be expected;
(3) No sterilization effects can be expected;
(4) No decolorant effects can be expected;
(5) For the purpose of merely obtaining clear water from contaminated water, it costs about 30% of total cost in a engineering work. The process includes transferring supernatant or overflow to a lower stage vessel for 5 to 10 times which is done every 6 to 24 hours and eventually clear water is obtained to be flown into a river.
(6) The process is not capable of removing materials dissolved in water and thus such materials remain in clear water to be flown into a river.

It is understood in the academic society and industries that contaminants included in contaminated water are unable to be purified by separation and removal using any kinds of flocculants. Therefore, in water treatment plants and sewage purification plants, solid materials and inorganic matters in the sewage are first removed by slow sedimentation, filtering, or by a slow sedimentation-separation using single flocculant (ferric chloride) mixed and stirred. Then after a slow sedimentation-separation, it is contacted with bacteria for 1 to 5 days by means of the activated-sludge process, whereby invisibly small bacteria are cultivated by giving air to digest it. This process calls for an enormous land, equipment, costs and time. Nevertheless, perfect purification is impossible. Therefore, contaminated water has been drained into rivers after adjusting its pH and filtered.

In dung processing, dung was contacted with bacteria for 5 to 7 days by the activated sludge process, then filtered through high polymer membranes, which cost 20 million Yen per cubic meter. This way, however, COD could be lowered to only 90 to 95 mg/liter. Thereafter, it was mixed with ferric chloride to settle contaminants included in it, then let it through a layer of activated carbon to make transparent water with COD of 30 mg/liter before drained into the river. This was the limit but was expensive; the cost of the purification equipment was 20 million yen per ton, while the processing costs were 2,500 to 6,000 yen per ton.

DISCLOSURE OF THE INVENTION

The purpose of this invention is, therefore, to provide a method which can recycle water at a low cost by efficiently purifying various types of contaminated water to highly pure water.

A contaminated water purification method according to the invention includes a first process in which at least two kinds of flocculants mixed into contaminated water so as to float and/or settle inorganic/organic matters.

The above first process will be repeated several times sequentially. Thus, middle water, drinking water and super pure water can be obtained from contaminated water.

The flocculant used in the first process is composed of a chemical including calcium (e.g. lime, bleaching powder, etc.) and one or more kinds of chemicals such as aluminum polychloride, ferric chloride, aluminum sulfate, alum, Sodium silicate, hydrochloride acid, sodium hydroxide, detergent, polymer flocculants, calcium carbonate, sodium bicarbonate, calcium hydroxide, iron sulfate, ammonium sulfate, sodium aluminate, zinc chloride, aluminum chloride, potassium alum, magnesium sulfate, magnesium chloride, sodium hypochlorite, hydrochloride acid, sulfuric acid, nitric acid, phosphoric acid, boric acid, surface active agents, cleanser, ammonia, chlorine, ozone, oxygen, stabilized chlorine dioxide, sulfur, sodium carbonate, iron chloride, sodium silicate.

Higher bleaching powder consists of 30–40% of lime and 70 to 60% of chlorine.

A purification method according to another embodiment of the invention includes a first process in which at least two kinds of flocculants are introduced into contaminated water for stirring therein and mixing therewith so as to float and/or sediment inorganic and organic matters. In the following second process, at least three kinds of flocculants are introduced into supernatant or overflow obtained in the first process for stirring therein and mixing therewith so as to float and/or sediment inorganic and organic matters remaining therein.

At least either one of the first or second process described above is repeated more than once. Thus, middle water, drinking water and super-pure water can be obtained.

The flocculants to be used in the first process are such as described above.

The primary composition of the flocculant used in the second process is a calcium-containing chemical added with one or more kinds of chemicals such as ferric chloride, aluminum polychloride, calcium carbonate, sodium bicarbonate, calcium hydroxide, iron sulfate, ammonium sulfate, sodium aluminate, zinc chloride, aluminum chloride, potassium alum, hydrochloric acid, sulfuric acid, nitric acid, phosphoric acid, boric acid, surface active agent, cleanser, ammonia, chlorine, ozone, oxygen, stabilized chlorine dioxide, sulfur, sodium carbonate, iron chloride, sodium silicate.

Higher bleaching powder requires no disinfectants and effects to decompose cyanide and also has deodorant, decolorant, purification of excrements effects. Lime has a greatest advantage among all flocculants in terms of sterilization, decomposing, purifying, decoloring, deodorization.

When contaminated water is admixed and stirred with lime or bleaching powder and then ferric chloride is added thereto for stirring and mixing therewith, a multiplier effect is brought about to purify the contaminated water.

Further utilization of alum in addition to the above chemicals results in a great purification effect in which impurities in the contaminated water and dissolved impurities are removed up to 99%, thus achieving sterilization, deodorization, decolorization and purification in a short time period.

More than four times repetition of purification process relative to supernatant obtained from each purification of contaminated water, such as human waste, animal waste, waste water from incineration plant or disposal treatment plant, sewage containing algae bloom, contaminated river water, factory effluent, industrial effluent or the like, will provide purified water comparable to drinking water within an hour.

Mere use of the above flocculant(s) can effect purification and deodorization of contaminated water. If, however, it is necessary to decompose oils and fats or other excrements, detergent or cleanser is admixed with contamination water during purification process so as to decompose such oils and fats and thereafter purification process is repeated by means of the above flocculant(s). In this way, purification can be achieved efficiently. This process produces sludge in the amount less than 50% of that produced by a conventional activated sludge process. Although it has been believed that reducing water content of sludge to a degree less than 80% is impossible, sludge from the purification process of the invention using suitable combination of detergent, calcium containing material, ferric chloride, potassium alum, aluminum polychloride has water content less than 67.4%, even after manual dehydration. Even lower water content can be expected when sludge is dehydrated by means of a centrifugal or a press-filter. Due to the multiplier effects of detergent and flocculant, a single stage purification made it possible to deodorize bad smell peculiar to sewage, remaining good smell of detergent. Addition of the above chemicals to sewage for admixing therewith more than two times results in supernatant which can be used as middle water. Additional more than 2 times repetition of the purification process without using detergent provides odorless supernatant. More than 4 times repetition of the purification process using disinfectant or bleaching powder provides drinking water. More than 5 times repetition of the purification process provides water substantially the same as super pure water. Addition of small amount of sulfur increases clarity of the purified water and maintains the quality of the purified water unchanged. Utilization of bleaching powder at the first and last stage of the purification process increases efficiency of the process, while providing increased deodorant effect and greatly reducing water content of sludge.

When fat and oil are contained in sewage or waste water; clay, vermiculate, mud and other materials which form a flocculation nucleus are mixed and stirred with the sewage or waste water. If an ultrasonic wave is employed to oscillate the sewage or waste water, the fat and oil contained therein decomposes into minute particles and adheres to the periphery of the floating nucleus. Thereafter, when the resulting floating nucleus is removed therefrom, purified water is obtained. Petroleum and waste water from tar sand in Alberta, Canada have been purified by a similar method.

When calcium carbonate is supplied to contaminated water for stirring and mixing therewith and thereafter carbon dioxide is admixed with the contaminated water, calcium carbonate reacts with carbon dioxide to form calcium bicarbonate which tends to dissolve in water, whereby reduced amount of sludge will be produced after purification of contaminated water. When calcium carbonate is used during introduction of exhaust gas into the purification system, calcium carbonate will react with carbon dioxide in the exhaust gas to be dissolved in water as calcium bicarbonate.

BRIEF DESCRIPTION OF THE DRAWINGS

FIGS. 1 and 2 illustrate purification process of the method according to the present invention.

FIGS. 3 and 4 illustrate examples to which the method of present invention is applied.

BEST MODE FOR PRACTICING THE INVENTION

Figure 4:
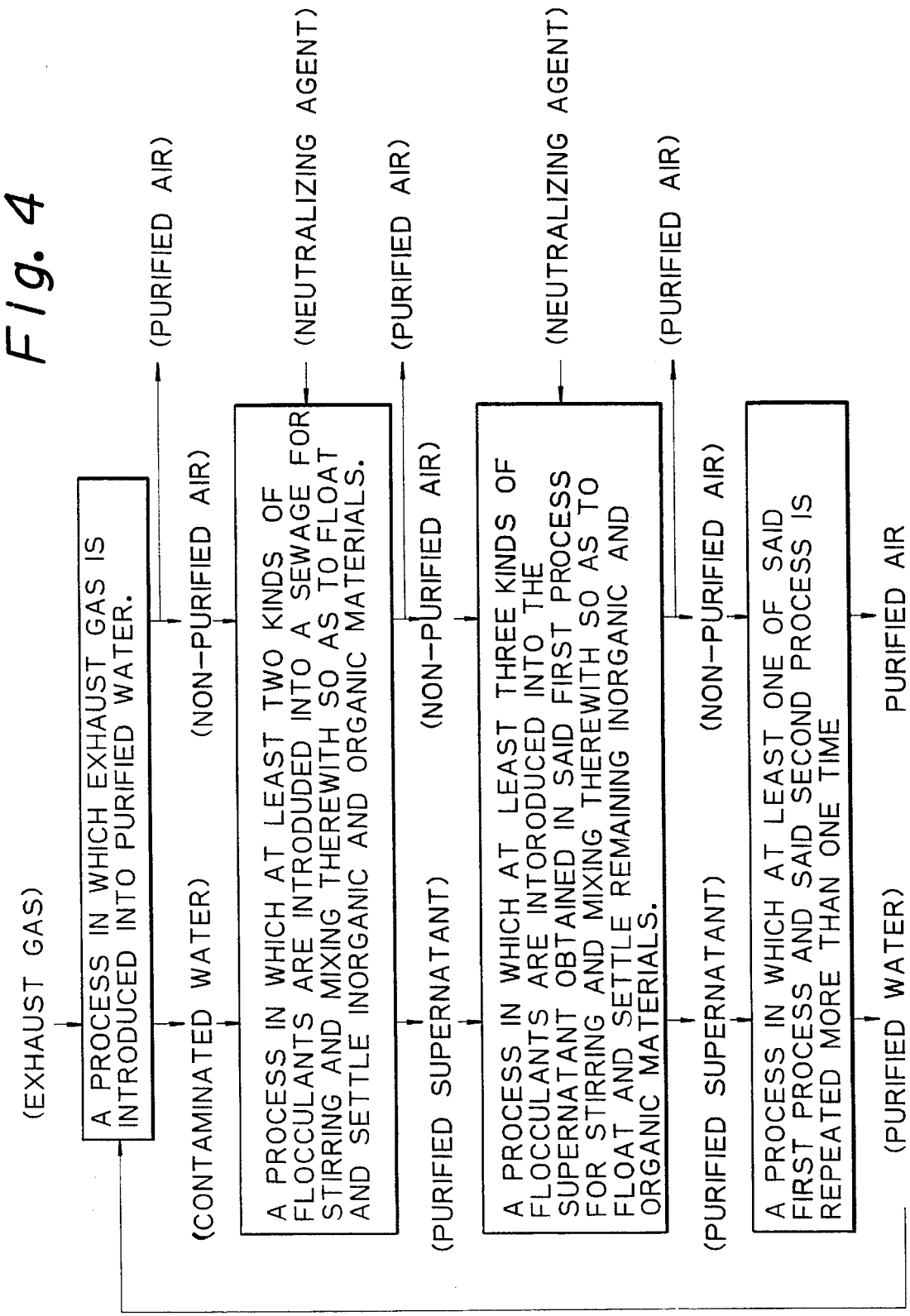

Several embodiments of the present invention will be explained hereinbelow.

For the purpose of explaining several embodiments of sewage purification process, a basic process of the present invention is shown in FIGS. 1 and 2.

All embodiments are based on the above basic process.

Example (Purification of Sludge or the like)

Algae bloom, red-tide or sludge from water is stirred and admixed with flocculant so as to flocculate and float any sludge in the contaminated water for purification thereof.

(A) Sludge from Kasumigaura Lake is introduced in a glass vessel up to a level of 2 cm from the bottom of the vessel. A 0.2 liter of water contaminated with green colored algae bloom is pored into the above vessel. The below listed chemicals are introduced into the vessel and stirred and admixed therein. 97% or more of the sludge excrements contained in the vessel has been flocculated and floated and obtained clear water. After having removed floating sludge, conditioning was made by means of acidic and basic agents (maintaining pH value of the liquid within 5 to 10, preferably at approximately 7, results in purified water which is clear).

Note: Repetition of process (A) 5 times or more resulted in clear and odorless water having both BOD and COD values less than 2 mm/liter.

(a) ferric chloride ( ) (30% concentration) 2 drops
(b) lime 0.25 gr.
(c) alum 0.25 gr.

(B) A liquid removed of sludge or purified water is transferred to another vessel and chemicals the same as (A) or below listed chemicals are introduced therein so as to stirring and admixing therein. Impurities remaining in the water was flocculated and sedimented within four minutes so as to purify and to clarify.

(a) ferric chloride (30% concentration) 2 drops
(b) lime or bleaching powder 0.25 gr.
(d) aluminum polychloride(30% conc.) 3 drops (C) Purified supernatant from (B) is transferred to another vessel and the below listed chemicals is introduced therein for stirring and admixing therewith. Impurities remaining in the liquid is flocculated and sedimented so as to obtain clear supernatant.

(a) ferric chloride (30% conc.) 2 drops
(b) lime 0.25 gr.
(d) aluminum polychloride (30% conc.) 3 drops (D) Purified supernatant from (C) is transferred to another vessel and the below listed chemicals are introduced therein for stirring and admixing therewith.

(a) ferric chloride (30% conc.) 2 drops
(b) bleaching powder 0.25 gr.
(d) aluminum polychloride 30% conc.) 3 drops Note: There will be a possibility in that only two kind of chemicals consisting of lime and bleaching powder or aluminum polychloride are used.

(E) Purified supernatant from (D) is transferred to another vessel and below listed chemicals are introduced therein for stirring and admixing therewith. Then, impurities remaining in the liquid flocculate and sediment within four minutes, resulting in clear supernatant (there will be a case in which ferric chloride is not used).

(c) alum 0.25 gr.
(d) aluminum polychloride (50% conc.) 0.3 cc
(f) aluminum sulfate (50% conc.) 0.3 cc Note: There will be a case in which (b) and (c) and one of (d) and (f), or (c) and one of (d) and (f) are used.

(F) Supernatant from (E) is transferred to another transparent glass made vessel and the below listed chemicals are added thereto for stirring and admixing therewith. After predetermined settlement time period, more clear supernatant is obtained.

(a) ferric chloride (50% conc.) 0.3 cc
(e) bleaching powder (or lime) 0.25 gr.
(c) alum 0.25 gr.
(f) aluminum sulfate (50% conc.) 0.3 cc
(d) aluminum polychloride (50% conc.) 0.3 cc Note: There will be a case in which (e) and one of (d) and (f) are used.

(G) Supernatant from (F) is transferred to another transparent glass made vessel and the below listed chemicals are added thereto for stirring and admixing therewith. After settlement of four minutes or less, extraordinarily clear supernatant can be obtained.

(e) bleaching powder (or lime) 0.25 gr.
(f) aluminum sulfate (50% conc.) 0.3 cc
(d) aluminum polychloride (20% conc.) 0.2 cc Any contaminated water or sewage can be purified so as to provide purified water being of clarity, odorless and sterilization in a reduced time period, large production rate and efficient manner by conducting 3 to 5 stages of purification processes which are appropriately selected from the above (A) to (G) processes, or by using chemicals selected from those used in the above processes or combination thereof for conducting 3 to 5 times stirring and admixing in the contaminated water for purification thereof, by, if desired, adding basic agent, acidic agent, detergent, soap, cleanser, sand, clay, mud, disinfectant or the like to the liquid for stirring and admixing therewith so as to decompose sludge or oils and fats, or so as to be seeds for floc formation, or so as to be pH regulating agent or sterilizing agent.

Example (Purification of Sewage from Disposal Plant)

0.2 liter of disposal sewage from Yumenoshima, Tokyo is introduced from a sample container into a clear glass made vessel. The disposal sewage is contaminated to present dark black, tar-like color and provides bad smell which tends to cause one to lose all senses. The below chemicals are stirred and mixed with the sample. After a few minutes settlement, sludge starts to form coagulation and, in ten minutes or less, height of sediment of sludge reaches to a level of one-ninth of the total water depth, remaining light brown supernatant of eight-ninth of total water depth. Bad smell is reduced by half. The supernatant is transferred to another clear glass made vessel.

(a) ferric chloride (50% conc.) 5 drops
(b) lime (fine powder) 0.5 gr.
(c) alum (fine powder) 0.5 gr.

(B) The below chemicals are stirred and mixed with the supernatant from (A). After three minutes settlement, sludge sediments to one-tenth of the total water depth, remaining translucent supernatant of nine-tenth of the total water depth thereabove. No bad smell is sensed.

(b) lime (fine powder) 0.5 gr.
(a) ferric chloride (50% conc.) 3 drops
(c) alum (50% conc.) 0.5 gr.
(d) aluminum polychloride (30% conc.) 3 drops
(f) aluminum sulfate (30% conc.) 3 drops (C) The translucent supernatant from (B) is transferred to another clear glass made vessel and the below chemicals are stirred and admixed therewith. After three-minute settlement, coagulation of sludge is formed to have one-tenth height of the total water depth, remaining transparent supernatant of nine-tenth height of total water depth thereabove.

(a) ferric chloride (50% conc.) 2 drops
(e) bleaching powder (fine powder) 0.25 gr.
(c) alum (fine powder) 0.25 gr.

(d) aluminum polychloride (50% conc.) 3 drops
(f) aluminum sulfate (50% conc.) 3 drops
(g) polymeric flocculant 0.25 gr.
(D) The supernatant from (C) is transferred to a clear glass made vessel and the following chemicals are stirred and mixed therewith.
(a) ferric chloride (30% conc.) 2 drops
(e) bleaching powder (fine powder) 0.25 gr.
(d) aluminum polychloride (30% conc.) 3 drops
(h) disinfectant 1 drop stabilized chlorine dioxide)

The contaminated water before purification having both 180,000 BOD and COD values is purified to 3–1 BOD and COD values after 3 to 5 stages of purification process. When, before purification, the contaminated water is mixed with calcium carbonate, sodium hydroxide, detergent, cleanser and the like or the combination thereof by stirring so as to decompose excrements and oils and fats, and then is mixed with the above various chemicals so as to form coagulation of the sludge, or is conditioned to be a pH value between 10 to 5, preferably approximately at 7, by means of acidic agent or basic agent, the contaminated water is purified at once to brilliantly clear water. The thus obtained supernatant and tap water are separately and sealingly contained in respective clear glass made vessels of the same configuration. Such tap water becomes cloudy within 2 months. On the contrary, the supernatant still remains unchanged, i.e., clear and odorless, after 4 years or more.

Example (Purification of Milk)

(A) Milk of 180,000 BOD and 170,000 COD contained in a vessel is mixed and stirred with below chemicals and is kept still. After four minutes or less, a white coagulation layer is formed to have a one-tenth of the total water depth, thus remaining a clear purified supernatant layer having a nine-tenth of the total water depth.
(i) sodium hydroxide (30% conc.) 2 drops
(a) ferric chloride (30% conc.) 2 drops
(b) lime (fine powder) 0.25 gr.
(c) alum (fine powder) 0.25 gr.
(B) The supernatant from (A) is transferred to a transparent, glass made vessel and is mixed and stirred with below chemicals and is kept still. After three minutes or less, coagulation layer of one-tenth of the total water depth is formed, remaining a clear, purified supernatant layer of nine-tenth of the total water depth.
(a) ferric chloride (30% conc.) 2 drops
(b) lime (fine powder) 0.25 gr.
(d) aluminum polychloride (30% conc.) 3 drops
(f) aluminum sulfate (30% conc.) 3 drops
(C) The supernatant from (B) is transferred to a transparent, glass made vessel and is mixed with below chemicals and is kept still. After three minutes or less, a white sediment layer is formed at the bottom of the vessel, remaining a transparent water layer of nine-tenth of the total water depth. The above processes are repeated 3 to 5 times or more using suitable combination of the above chemicals. BOD and COD of the thus purified supernatant both are below 3.
(e) bleaching powder (fine powder) 0.25 gr.
(d) aluminum polychloride (30% conc.) 3 drops
(f) aluminum sulfate (30% conc.) 3 drops In the treatment of milk, coagulant effective to protein is preliminarily stirred and mixed therewith and coagulated protein can be recovered from the liquid for suitable use.

Example (Purification of Human Waste)

(A) A 0.2 liter of human waste is stirred and mixed with 0.5 cc of sodium hydroxide solution (50% conc.) for the purpose of directly purifying and clarifying and then solid matter and sediment are removed. Then, supernatant is transferred to a transparent glass vessel and is stirred and mixed with below chemicals and is kept still. After four minutes or less, a coagulated bottom of one-tenth height of the total water depth is obtained, remaining a translucent purified supernatant of nine-tenth height of the total water height thereabove. Smell is reduced to one-third.
(a) ferric chloride (50% conc.) 0.5 cc
(b) lime 0.5 gr.
(c) alum 0.5 gr.
(C) The translucent supernatant from (A) is transferred to a transparent glass vessel-and is stirred and mixed with below chemicals and is kept still. After three minutes, a coagulated layer having a height of one-tenth the total depth is formed, remaining transparent purified supernatant layer having a height of nine-tenth the total depth thereabove.
(b) lime (fine powder) 0.3 gr.
(a) ferric chloride (30% conc.) 0.2 cc
(c) alum 0.25 gr.
(d) aluminum polychloride (50% conc.) 3 drops
(f) aluminum sulfate (50% conc.) 3 drops
(C) The purified supernatant from (B) is transferred to a transparent glass vessel and is stirred and mixed with below chemicals. Thus, transparent purified supernatant is obtained.
(a) ferric chloride (30% conc.) 2 drops
(b) lime (fine powder) 0.3 gr.
(d) aluminum polychloride (50% conc.) 3 drops
(f) aluminum sulfate (50% conc.) 3 drops
(D) The transparent supernatant from (C) is transferred to a transparent glass made vessel and is stirred and mixed with below chemicals. After 3 to 5 or more repetition of purification process, BOD and COD both are reduced to 3–1 or less. When one drop of disinfectant is added in the last purification stage, sterilized supernatant is obtained. For several years, no change is recognized with such supernatant when it is sealingly contained in a transparent vessel.
(a) ferric chloride (30% conc.) 2 drops
(e) bleaching powder (fine powder) 0.3 gr.
(d) aluminum polychloride (30% conc.) 3 drops Example (Purification of Human Waste)

(A) All solids in a human waste sewage are removed by means of a filtration means. A resultant filtrate of 0.2 liter is stirred and mixed with 1 cc of sodium hydroxide solution (50% conc.) and solid contained therein is removed. Then, the below chemicals are added thereto and rapid agitation is given to the liquid and thereafter the liquid is kept still. After several minutes, the impurities contained in the liquid is settled to a height of one-tenth the total depth, remaining an unclear supernatant layer of a height of nine-tenth the total depth thereabove. Smell of the supernatant is reduced by half.
(i) detergent (50% conc.) 1 cc
(a) ferric chloride (50% conc.) 3 drops
(b) lime 0.5 gr.

(c) alum 0.3 gr.

(d) aluminum polychloride (50% conc.) 3 drops (k) clay as coagulation seeds small amount (B) The transparent supernatant from (A) is transferred to another glass made vessel and is stirred and mixed with below chemicals and then is kept still several minutes. Sludge remaining is the supernatant is coagulated and settled to a height of one-tenth the total depth, remaining a purified, translucent supernatant of a height of nine-tenth the total depth thereabove.

(a) ferric chloride (50% conc.) 3 drops (l) calcium hydroxide 0.3 gr.

(c) alum (50% conc.) 3 drops (d) aluminum polychloride (50% conc.) 3 drops (f) aluminum sulfate (30% conc.) 2 drops (C) The transparent supernatant from (B) is transferred to a transparent glass made vessel and is stirred and mixed with below chemicals and then is kept still. A clearly purified supernatant is obtained.

(a) ferric chloride (30% conc.) 2 drops (m) calcium carbonate (fine powder) 0.25 gr.

(d) aluminum polychloride (30% conc.) 3 drops (n) carbon dioxide (D) The transparent supernatant from (C) is transferred to a transparent glass made vessel. Then, clearly purified supernatant is taken out and 3–5 times or more repetition of purification is given thereto. By this, such highly contaminated sewage is purified to have a 3 or less COD value within one hour and with large production rate. When one drop of stabilized chlorine dioxide is given in the last purification stage and resulting purified supernatant is sealingly contained in a transparent container. Such supernatant remains unchanged more than five years.

(e) bleaching powder (fine powder) 0.25 gr.

(a) ferric chloride (30% conc.) 2 drops (d) aluminum polychloride (30% conc.) 3 drops Example (Purification of Algae Bloom containing Sewage)

(A) A 0.2 liter of green-colored sewage contaminated with algae bloom, which smells fishy, is filtrated to remove floating algae bloom and solid therein. The resultant filtrate is stirred and mixed with below chemicals. Sludges contained in the filtrate is rapidly coagulated and separated from the remaining supernatant. Thus, supernatant is clearly purified.

(i) sodium hydroxide or sodium 3 drops carbonate (30% conc.)

(j) detergent or cleanser 8 drops

—When particular sewage is extremely contaminated, this agent may be added after stirring and mixing or after removing floating material.—

(b) lime (fine powder) 0.25 gr.

(a) ferric chloride (30% conc.) 2 drops (c) alum (30% conc.) 3 drops (d) aluminum polychloride (30% conc.) 2 drops (B) The transparent supernatant from (A) is transferred to another transparent vessel and is stirred and mixed with below chemicals. Then, sludge contained in the supernatant is rapidly separated within four minutes or less.

(a) ferric chloride(30% conc.) 2 drops (b) lime (fine powder) 0.25 gr.

(c) alum (30% conc.) 3 drops (d) aluminum polychloride (30% conc.) 3 drops (C) The transparent supernatant from (B) is transferred to a transparent vessel and is stirred and mixed with below chemicals. Then, the supernatant is purified more clearly.

(a) ferric chloride (30% conc.) 2 drops (b) lime (fine powder) 0.25 gr.

(d) aluminum polychloride (30% conc.) 3 drops (D) The transparent supernatant from (C) is transferred to a transparent vessel and is stirred and mixed with below chemicals. Then, the supernatant is purified more clearly.

(b) lime (fine powder) 0.25 gr.

(d) aluminum polychloride (30% conc.) 3 drops (f) aluminum sulfate (30% conc.) 3 drops (E) The transparent supernatant from (D) is transferred to another transparent vessel and is stirred and mixed with below chemicals. The supernatant is further purified. Three to five time-repetition of purification stage is conducted by suitably combining the above (A) to (E) processes and the chemicals used in each of the process. Thus, the supernatant is purified so as to reduce BOD and COD both to 1–3 or less.

(a) ferric chloride (30% conc.) 2 drops (b) lime or bleaching powder 0.2 gr.

(d) aluminum polychloride (30% conc.) 2 drops

Example (Purification of Sewage from Papermill)

(A) Sewage from a papermill can be purified, the sewage being extremely contaminated. A 0.2 liter of such sewage is rapidly stirred and mixed with below chemicals. After settlement thereof for a few minutes, a sediment of sludge of a height of one-tenth the total depth is formed, remaining thereabove a milky supernatant layer of a height of nine-tenth the total depth.

(a) ferric chloride (30% conc.) 3 drops (b) lime (fine powder) 0.25 gr.

(c) alum (fine powder) 0.25 gr.

(B) The transparent supernatant from (A) is transferred to another transparent vessel and is stirred and mixed with below chemicals. Then, coagulation sediment begins, resulting in sediment of sludge having a height of one-tenth the total depth and a transparent supernatant layer of a height of nine-tenth the total depth above the sediment.

(a) ferric chloride (30% conc.) 2 drops (b) lime (fine powder) 0.25 gr.

(c) alum (30% conc.) 3 drops (d) aluminum polychloride (30% conc.) 3 drops (f) aluminum sulfate (30% conc.) 2 drops (C) The transparent supernatant from (B) is transferred to another transparent vessel and is stirred and mixed with below chemicals. After 3 to 5 or more repetition of purification process, the sewage having been extremely contaminated is purified to 3–1 or less BOD and COD values. A single drop of disinfectant is added to the resultant supernatant and is sealingly contained in a bottle. Such liquid has no inclination of rot after 4 years or more.

(a) ferric chloride 1 drop (b) lime 0.2 gr.

(d) aluminum polychloride (30% conc.) 2 drops

There will be a case in which lime and aluminum polychloride are exclusively used.

Example (Purification of Sewage from Slaughter House)

(A) A 0.2 liter of sewage (containing rot drainage) from a slaughter house is stirred and mixed with below chemicals. All sludge containing in the sewage is coagulated and settled to one-tenth the total depth in three minutes, leaving thereabove a translucent supernatant layer of a height of nine-tenth the total depth.
  (a) ferric chloride (30% conc.) 3 drops
  (b) calcium or lime (fine powder) 0.3 gr.
  (c) alum (fine powder) 0.3 gr.
(A) The supernatant from (A) is transferred to another transparent vessel and is mixed with chemicals the same as those in the above (A) so as to obtain new supernatant. The above procedure is repeated 3 to 5 times or more. Then, sludge, heavy metals, colon bacilli, fats or other toxic substances all are purified to thereby reduce BOD and COD both to 3–1 or less. In most ideal purification system, any solids and insolubles are removed from the sewage by means of filter means. The resultant filtrate is combined with soda, soap soda, detergent, soap, cleanser, sand, clay, mud, acidic agent, basic agent, disinfectant and the like. The resultant mixture is processed using chemicals for the purpose of further purification thereof. It is also possible to mix flocculant effective for proteins with the liquid prior to supplying purification agent thereto so as to recover such protein and thereafter purification process is conducted. Proteins can also be recovered together with purification agents.

Example (Purification of Sewage from Slaughter House)

(A) A 0.2 liter of sewage from a slaughter house is stirred and mixed with below chemicals. After settlement for a few minutes or less, sludge contained therein is coagulated and settled, thus resulting slightly transparent supernatant.
  (i) sodium hydroxide solution (30% conc.)
  (a) ferric chloride (30% solution)
  (b) calcium or lime (fine powder)
  (f) aluminum sulfate (30% solution)
(B) The purified, slightly transparent supernatant is transferred to a transparent vessel and is stirred and mixed with below chemicals. After settlement for a few minutes or less, coagulated sediment is formed and the resultant supernatant is clearly purified. The resultant, purified supernatant is transferred to another vessel and is stirred and mixed with a suitable combination of calcium or calcium containing material, bleaching powder, iron chloride, iron sulfate, aluminum sulfate, aluminum polychloride, polymer flocculant, sand, clay, mud, disinfectant, soda, washing soda, soap, cleanser and the like. Repetition of the process 3 to 5 or more, BOD and COD of the resultant supernatant both are reduced to 3–1 or less.
  (a) ferric chloride (30% solution)
  (b) calcium or lime (fine powder)
  (d) aluminum polychloride (30% solution)

Example (Purification of Pig Waste)

(A) A 0.2 liter of pig waste is purified by stirring it and mixed with below chemicals. The resultant liquid is then kept still. A rapid coagulation of sludge occurs to form a sediment having a height of one-tenth the total depth, leaving thereabove a substantially transparent water layer having a height of nine-tenth the total depth.
  (f) aluminum sulfate 1 ppm
  (e) bleaching powder 1 gr.
  (k) clay or mud 1–2 gr.
  (a) ferric chloride (30% conc.) 3 drops
  (b) calcium 0.5 gr. or lime 0.25 gr.
  (f) alum (30% conc.) 3 drops
(Addition of ammonia may cause deodorizing effect.)

Example (Purification of Pig Waste)

(A) A 0.2 liter pig waste is purified first by removing solid materials contained therein by means of a filter means. The resultant filtrate is stirred and mixed with below chemicals and is then kept still. A rapid coagulation of sludge occurs to form sediment having a height of one-tenth the total depth, leaving thereabove a substantially transparent supernatant layer having a height of nine-tenth the total depth.
  (a) ferric chloride (50% conc.) 3 drops
  (b) calcium or calcium containing 0.3 gr. material or lime
  (c) alum 0.3 gr.
  (g) ammonia 2 drops
(B) The supernatant from (A) is transferred to a transparent glass made vessel and is stirred and mixed with substances the same as above (a), (b) and (c) or below chemicals. A rapid coagulation occurs, leaving a transparent supernatant layer.
  (a) ferric chloride (50% conc.) 3 drops
  (b) lime (fine powder) 0.3 gr.
  (d) aluminum polychloride (30% conc.) 3 drops
(C) The transparent supernatant from (B) is transferred to a transparent vessel and is kept still. A rapid coagulation occurs and 97% of impurities remaining in the supernatant is settled, thus making the resultant supernatant clearer. The resulting supernatant is transferred to another vessel and is mixed with calcium or calcium containing material and appropriate combination of ferric chloride, iron sulfate, aluminum polychloride, aluminum sulfate, alum and polymer flocculant, while maintaining pH value of the liquid within a range from 11 to 5, preferably approximately at 7. Such a purification procedure is repeated 3–5 times or more. It takes only one hour or less to reduce BOD or COD of the liquid to 3–1.
  (a) ferric chloride (30% conc.) 2 drops
  (e) bleaching powder (fine powder) 0.25 gr.
  (d) aluminum polychloride (30% conc.) 3 drops Example (Purification of Sewage from Kitchen)

(A) A 0.2 liter of drainage from a kitchen of a hotel containing lard (pig fats) and vet (cow fats) is stirred and mixed with below chemicals. The drainage which has been clouded with black material and which has contained a plenty of sludge is purified, resulting in coagulated sediment of such sludge having a height of two-eighth the total depth and a grayish supernatant layer having a height of six-eighth the total depth.
  (h) sodium hydroxide (50% conc.) 0.5 cc
  (i) detergent 0.3 cc
  (a) ferric chloride (50% conc.) 5 drops
  (b) calcium containing material 0.5 gr. or lime
  (c) alum 0.3 gr.
(B) The grayish supernatant from (A) is transferred to a transparent glass made vessel and is stirred and mixed with below chemicals. The remaining sludge is coagulated to form a sediment having a height of two-eighth the total depth, resulting in a clear supernatant layer above the sediment having a height of six-eighth the total depth.

(h) sodium hydroxide (30% conc.) 0.3 cc (i) detergent 0.2 cc (a) ferric chloride (30% conc.) 3 drops (b) lime 0.25 gr.

(d) aluminum polychloride (30% conc.) 3 drops (C) The clear supernatant from (B9 is transferred to a transparent vessel and is stirred and mixed with below chemicals. The remaining sludge and flocculant form a small amount of settlement at the bottom of the vessel in three minutes or less, making substantially the whole portion in the vessel transparent. The resultant supernatant is transferred to another vessel and is mixed with the purification agents in (C), or calcium or calcium containing material suitably combined with ferric chloride, iron sulfate, aluminum sulfate, aluminum polychloride, polymer flocculant, alum, chlorides, sulfates, bleaching powder, ammonia, charcoal, acidic agents, basic agents, sodium silicate, and any suitable flocculants, while maintaining pH value of such liquid within a range from 11 to 5, preferably approximately at 7. Such purification process is repeated 3–5 times or more. In the late stage, disinfectant is used so as to sterilize the liquid. As a result, the sewage which has been extremely contaminated can be inexpensively purified in an hour or less to a water comparable to pure water. Such water is transparent, odorless, sterilized and contains no impurities, BOD and COD of which both being 3–1 or less.

The water purified substantially to pure water by the above repeated process can be passed through a osmotic membrane or ion exchange membrane so as to inexpensively obtain pure water or super-pure water with a higher production rate.

(a) ferric chloride (30% conc.) 1 drop (b) bleaching powder (fine powder) 0.12 gr.

(d) aluminum polychloride (30% conc.) 2 drops

An example in which a method of the invention is applied to purification of exhaust gas is shown in FIGS. 3 and 4.

The sewage having been utilized in purification of such exhaust gas and having been purified by means of flocculants can repeatedly used, since $CO_2$ contained in the exhaust gas is dissolved and decomposed in water by the amount equivolumetric to water.

On the other hand, and when $NO_{1-5}$, $SO_{1-3}$, $CO_{1-3}$ still remain in the exhaust gas, such gas can be treated by directly introducing it in water or aqueous solution containing a quantity of flocculant, or by injecting it in water or aqueous solution containing a quantity of flocculant as microbubbles. The resultant water or aqueous solution is then introduced into a vessel and is circulated therein so as to be contacted with contaminated water and so as to be dissolved therein. Thus thus obtained clean gas is discharged in to ambient air. Sulfuric acid and nitric acid generated during purification of $SO_{1-3}$ and $NO_{1-5}$ are continuously decomposed and purified by means of flocculant, whereby purified water can continuously be utilized.

Figure 5:
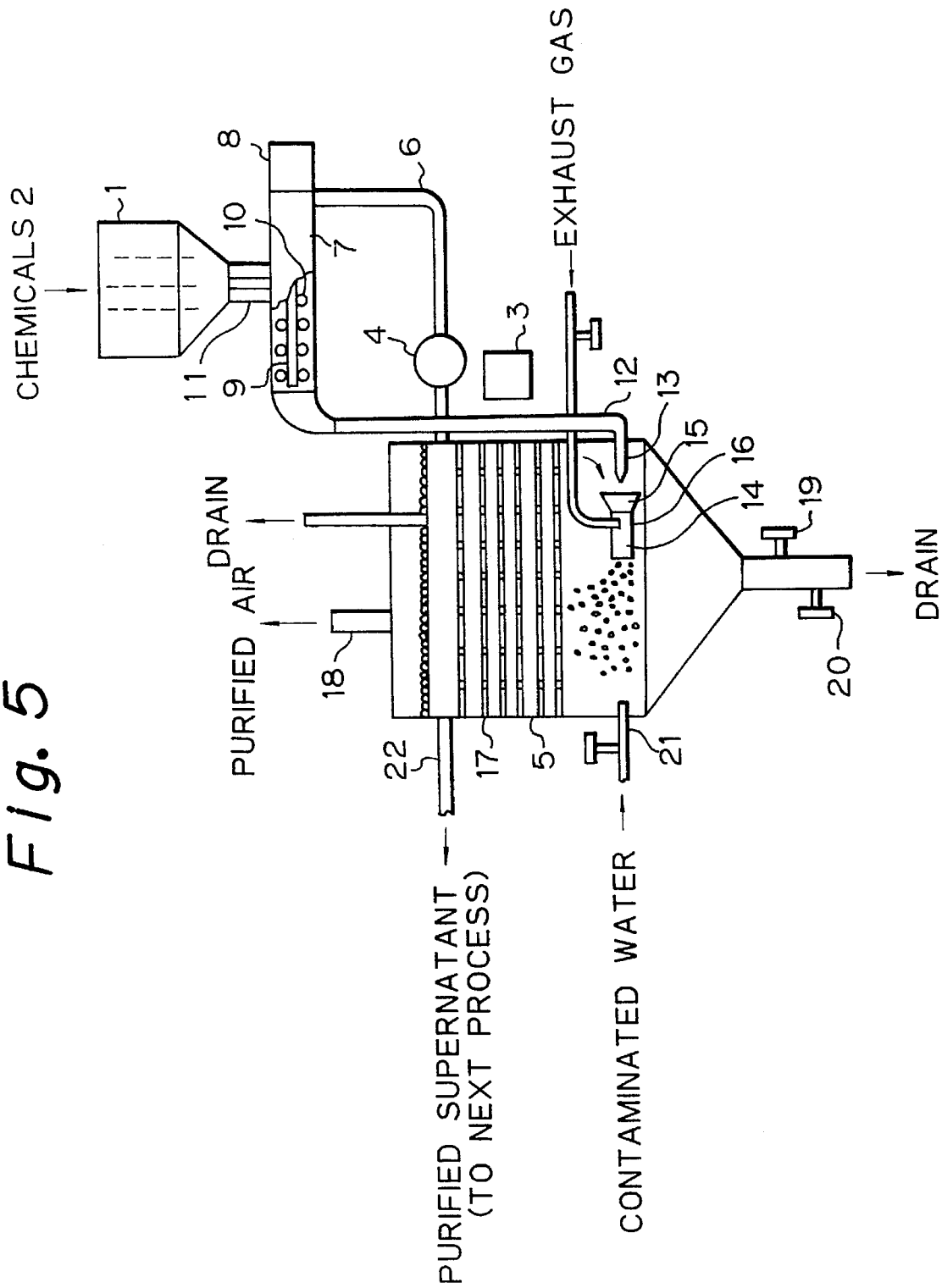
FIG. 5 a side elevational view of an example of the device for practicing the present method.

An example of the device for conducting the method of the invention will be briefly explained hereinbelow with reference to FIG. 5. This device is intended to purify either one or both of sewage and exhaust gas.

A hopper 1 is divided into an adequate number of compartments into which a single or mixed coagulants consisting of various chemicals are put. A switch on a control panel 3 is turned on to start a pump 4 which sends contaminated water from a purification tank 5 to a mixer 7 via a suction pipe 6 with some pressure.

Liquid to be purified is sent forward by rotating a screw 9 connected to a motor 8, and the volume of the liquid going through the mixer 2 is calculated by a flow meter 10 installed in the mixer 2. A certain amount of each coagulant necessary for a ton of liquid to be purified is fed into the mixer 2 via a supply pipe according to the instruction from the control panel 3.

When the liquid to be purified and the coagulant are mixed, the mixture flows down with pressure via an induction pipe 12 and injected into the purification tank 5 with a high pressure by the tip of a nozzle 13 installed within the tank 5. Sewage water around the nozzle 13 in the tank 5 is forced into a pipe 14 through a widely opened opening 15 of the pipe with a rate twice the quantity from the nozzle 14. At this time, sewage passes through around a exhaust gas ejector 16 located in the pipe under high-speed and high-pressure.

On the other hand, the exhaust gas is sucked at a high speed from the ejector 16 and is mixed with liquid to be purified and ejected from the nozzle 13 and becomes a number of bubbles with ultra fine particles, from which it is injected from the pipe 14 and rotates within the purification tank 5, wherein it contacts and is mixed with the liquid to be purified. $CO_{1-3}$, $SO_{1-3}$ and $NO_{1-5}$ included in the bubbles are absorbed and dissolved in the liquid to be purified successively. $SO_{1-3}$ dissolves and changes to dilute sulfuric acid, and $NO_{1-5}$ dissolves and changes to dilute nitric acid.

These acids are progressively neutralized in the mixture of various purifying chemicals, dissolved, and purified. Simultaneously, going up in the liquid to be purified, the gas collides with the punching metals 17 installed in the purification tank 1 with an adequate number and collides with other matters, whereby it rotates and dissolves to repeatedly purify the liquid. Finally, the gas is released in the atmosphere without any contaminants from the exhaust pipe 18.

The drain that neutralized various acids deposits on the bottom of the purification tank 5 is taken out by opening the valves 19 and 20.

When both exhaust gas and contaminated water or latter alone is to be purified, the contaminated water is fed from the pipe 21 into the tank 5 in which said purification process takes place, thereafter the supernatant liquid is sent to the next process of the purification apparatus from the pipe 22. Floating matters generated in the purification process are removed by sucking from the sucking pipe 23 above the tank, while the deposits are removed from the bottom of the purification tank 5.

The floating matters are washed and used as regenerated materials (for example, regenerated paper, regenerated building materials, and other materials). The deposits are mixed with sodium silicate and other materials to obtain solidified materials which can be used for land reclamation, while they are washed to obtain purified sand which can be used as construction sand to be mixed with cement.

The purified water recovered from the process of this invention can be recycled as industrial, agricultural or drinking water.

Possible Applications in the Industry

This invention can be applied to purify not only contaminated water and exhaust gas, but also water from swimming pools, bathes, hot springs and various types of entertainment facilities, or air from factories, theaters, gathering places, exhibition places and the like.

In addition to these applications, a partial list of embodiments is as follows.

(1) A purification method and apparatus that produces harmless water and air by purifying and reusing at a low cost contaminated water on the earth and in space, or a large amount of water used and disposed for the purpose of preventing environmental contamination (2) Purification of domestic waste water, miscellaneous sewage, industrial waste liquid, factory waste liquid, and cooling water from nuclear power plants, thermoelectric power plants, boilers, air-conditioners and so on.

(3) Various kinds of waste liquid, garbage liquid waste, incinerator liquid waste, dyes, detergent, kitchen water, slaughterhouse wastes, meat and fish processing wastes.

(4) Purification of algae bloom, red tides, seaweeds and muddy water.

(5) Sterilization of domestic animals, animal wastes, bacteria, colon bacilli, cholera germs, and Salmonellae.

(6) production of phosphorus, nitrogen, carbon dioxide, cyanogen, drugs, heavy metals, agricultural chemicals and sterilizing chemicals.

(7) Purification of rivers, lakes and swamps, ponds, seas and sludge.

(8) Purification of drinking water, semi-drinking water and sewage.

(9) Purification of highly-contaminated water at construction sites (dams, tunnels, rivers, reclamation, under tunnels, building, bridges, dredging, marine developments, tunnel constructions, and deep underground constructions).

(10) Prevention of environmental contamination and securing of emergency drinking water in case of draughts or disasters.

(11) Production and re-utilization of super pure water that can be used after the process of purification by the last membrane only to clean IC and electronics parts.

(12) Purification, desalination and conversion of cooling and heating water for nuclear power plants, thermoelectric power plants, boilers, combustion engines and heat engines, hot water, or seawater pumped up in a large amount or for cooling, into drinking water, semi-drinking water or industrial water.

(13) Afforestation of deserts by purifying and desalinating seawater which is sent to large lakes made in the desert and a canal connected to it.

I claim:

1. A method for purifying sewage comprising treating said sewage with flocculants in a purification tank and purifying an exhaust gas containing $CO_{1-3}$, $NO_{1-5}$ or $SO_{1-3}$ by introduction thereof into the sewage, wherein the flocculants are a calcium containing material and one or more substances selected from the group consisting of aluminum polychloride, ferric chloride, aluminum sulfate, alum, sodium hydroxide, detergents, polymeric flocculants, sodium bicarbonate, iron sulfate, ammonium sulfate, sodium aluminate, zinc chloride, aluminum chloride, potassium sulfate, magnesium sulfate, magnesium chloride, sodium hypochlorite, a flocculant effective for protein, sulfuric acid, nitric acid, hydrochloric acid, phosphoric acid, chlorine dioxide, ammonia, chlorine, ozone, oxygen, sulfur, sodium carbonate, sodium silicate, and clay, wherein the treatment of the sewage with the flocculants is repeated until the achievement of the required degree of purification and wherein the flocculants are introduced from a partitioned hopper to a mixer equipped with a screw connected to a motor and mixed in the mixer with one portion of sewage supplied from said purification tank, the resulting mixture is injected from a nozzle of an induction pipe through an exhaust gas ejector into the tank, sewage around the nozzle in the tank is forced into the ejector, and the exhaust gas is sucked through the ejector into the purification tank to form a number of bubbles with ultra fine particles, deposits from the bottom of the purification tank are drained, a purified supernatant is removed from the upper portion of the tank and purified air is exhausted from the top of the tank.

2. A sewage purification method according to claim 1, wherein the calcium containing material is calcium oxide, calcium hydroxide, calcium carbonate, calcium hydrogencarbonate, limestone, calcium containing seaweeds or calcite.

3. A sewage purification method according to claim 1, wherein the sewage is contaminated river water, lake water, swamp water of bay seawater, domestic sewage, industrial waste fluid, butcher waste fluid, dust waste fluid, garbage incinerator waste fluid, dung fluid, agricultural chemical containing waste fluid, germicide containing waste fluid or kitchen sewage.

\* \* \* \* \*